Patented Aug. 15, 1939

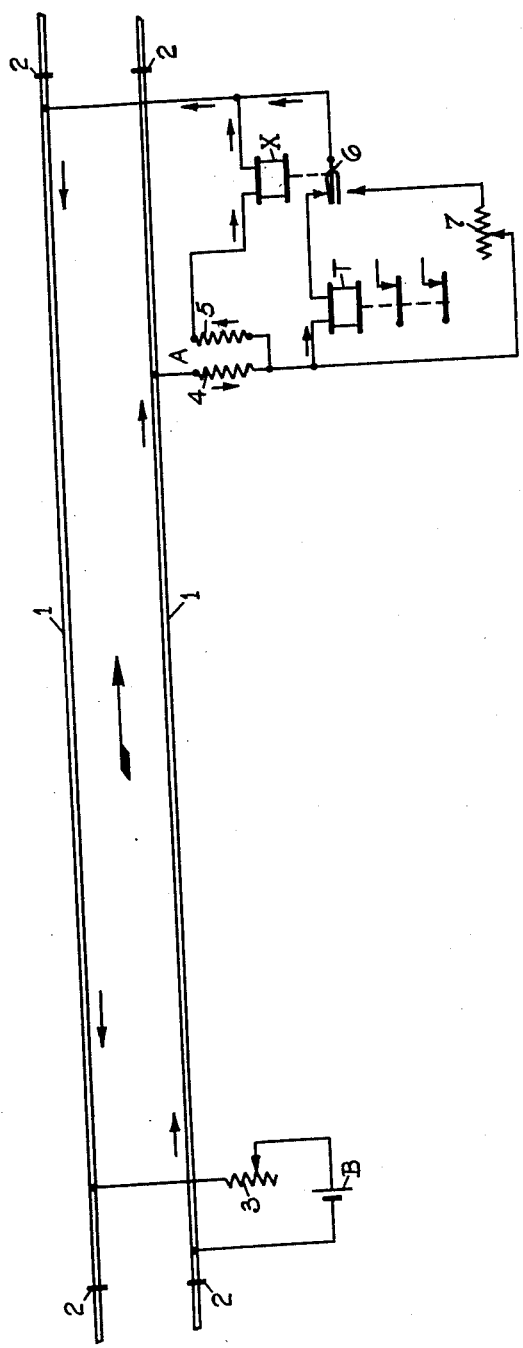

2,169,286

UNITED STATES PATENT OFFICE 2,169,286

TRACK CIRCUIT FOR RAILROADS

Neil D. Preston, Rochester, N. Y., assignor to General Railway Signal Company, Rochester, N. Y.

Application May 21, 1936, Serial No. 81,057

9 Claims. (Cl. 246—41)

This invention relates to track circuits for railroads, and more particularly to an improved form of electro-responsive means to detect the presence and absence of the shunting effect of the wheels and axles of a car or train on the track circuit.

This invention is in the nature of an improvement upon the track circuit organization disclosed and claimed in the application of Neil D. Preston and Oscar S. Field, Ser. No. 81,056, filed May 21, 1936.

In the ordinary track circuit, a track relay is connected across the track rails at one end of a track section and is maintained energized by current supplied from a track battery, or other source of current, at the other end of the track section through a limiting resistance. The wheel shunt of a car or train greatly reduces the resistance between the track rails, and draws more current from the battery through the limiting resistance, thereby decreasing the inter-rail potential, and reducing the current through the track relay to the point where its armature releases. Variations in the resistance of the ballast of the track circuit in wet and dry weather produce corresponding effects upon the track relay energizing current; and if the batery voltage and limiting resistance are selected or adjusted to provide adequate operating current for the track relay under wet ballast conditions, the relay is over-energized, and its responsiveness to the wheel shunt is impaired, when the ballast dries out and the ballast resistance is high. This and other limitations of the ordinary track circuit are well known, and need not be further discussed.

The primary object of this invention is to obviate the limitations of the ordinary track circuit by providing means associated with the usual track relay which assures release of its armature by wheel shunts of relatively high resistance under different varying ballast conditions.

The variations in ballast resistance, which adversely affect the performance of the ordinary track circuit, are inherently slow or gradual, as the ballast accumulates moisture in wet weather and dries out in dry weather; whereas, the change in resistance across the track rails produced by the application and removal of a wheel shunt is inherently sudden, much like the closing of a switch, as the wheels and axles of a car or train make and break contact with the track rails at the insulated joints at the ends of the track section.

Taking into consideration this radical difference in the nature of the change in inter-rail resistance caused by variation of ballast resistance and by a wheel shunt, it has been proposed, as disclosed in the application of Preston and Field above mentioned, to utilize the induced voltage impulse, which is created by the track relay upon the sudden decrease in its energizing current occasioned by the application of a wheel shunt, to de-energize an auxiliary or secondary quick-acting relay to open the circuit connections for the track relay and thus assure positive release of its armature.

Generally speaking, and without attempting to define the nature and scope of the present invention, it is proposed to employ a coupling transformer in such an organization of primary and secondary relays for the purpose of providing a de-energizing voltage for the secondary relay upon application of the wheel shunt, and an energizing voltage for said secondary relay upon removal of the wheel shunt, so as to obtain more positive and reliable response of the secondary relay with a greater operating margin under varying conditions of the resistance of the ballast and the wheel shunt.

Various other characteristic features, attributes, and advantages of this particular improvement will be in part apparent, and in part pointed out, as the description progresses.

The accompanying drawing illustrates in a simplified and diagrammatic manner one specific embodiment of the invention, the parts and circuits being illustrated for the purpose of facilitating an understanding of the principles and mode of operation of the invention, rather than for the purpose of showing the particular structural organizations that would be employed in practice.

Referring to the accompanying drawing, there is illustrated diagrammatically a typical track circuit section equipped with the usual track relay and associated means in accordance with this invention. The track rails 1 of this track section are bonded together in the usual way, with insulated joints 2 in the track rails to define the ends of the track section. Across the track rails 1 at one end of this track section, preferably the entering end, is connected a track battery, or similar source of current, in series with the usual adjustable limiting resistance 3. At the other end of the track section is a track relay of the usual type and construction for operating contacts to control signals or to perform any other function of a track relay; and this relay is connected across the track rails in series with the primary 4 of a suitable coupling transformer A, and the front contact 6 of an auxiliary or secondary relay X. This secondary relay X is connected in multiple with the primary track relay in series with the secondary 5 of said coupling transformer. The contact finger 6 of the secondary relay X is provided with a make-before-break back contact which, when said relay X is de-energized, connects an adjustable ohmic resistance 7 in multiple with the track relay T. These various electrical characteristics are obvious from the drawing and need not be further described.

It is contemplated that the track relay T may be of the usual type and construction, and that the relay X will be preferably of the same tractive armature type, but with a much smaller magnetic circuit, and with a light armature so that the relay is quick-acting, although the relay X may take other forms.

The mode of operation may be explained as follows:— Under normal conditions when no train is present, the relays T and X are energized in multiple by a steady current; and the voltage of the battery B, the limiting resistance 3, and the resistances of these relays is chosen or adjusted so that the relays have the proper working current under most unfavorable wet ballast conditions. As the ballast resistance changes, the energizing current through the relays T and X varies accordingly; but such change is gradual, and there are no voltages induced in the windings of these relays or the coupling transformer A.

When a train enters the track section, the inter-rail voltage at the relay end is reduced, tending to de-energize the track relay T in the usual way characteristic of the ordinary track circuit. In addition to this ordinary shunting action, the sudden reduction in inter-rail potential causes relatively quick current changes, which is in accordance with this invention produce induced voltages to de-energize the secondary relay X and open its contact 6 to positively de-energize the track relay T. As the impressed voltage, supplying energizing current to the track relay T, is suddenly reduced by the application of the wheel shunt, the current drops in this relay; and the decay of magnetic flux induces a voltage in its windings, which in accordance with well-known principles, tends to sustain the flow of current. This voltage, which may be termed the voltage of self-induction of the track relay T, acts to produce potentials across the secondary relay X to oppose the current in this relay; and due to the relatively larger magnetic circuit and greater stored magnetic energy in the primary track relay T, its voltage of self-induction overpowers that of the relay X and acts to de-energize the relay X, in the manner characteristic of the organization disclosed in the prior application of Field and Preston above mentioned.

In connection with this de-energizing effect of a wheel shunt upon the secondary relay X, there is a conducting path, which may be termed a discharge path, for the current produced by the voltage impulse of self-induction of the track relay T, this discharge path being in multiple with the secondary relay X through the ballast resistance and wheel shunt. It is apparent that the lower the resistance or impedance of this discharge path, the slower is the decay of current through the track relay T and its connections to the track rails when the impressed or driving voltage is reduced by the wheel shunt; but while the current in the discharge path is being maintained the de-energizing potential for the secondary relay X is sustained. If the resistance of the ballast and wheel shunt is relatively high, the decay of current is more rapid, and a greater de-energizing potential for the relay X is created. Thus, the organization in a sense compensates for variations in ballast resistance.

The purpose of the coupling transformer A, constituting the improvement of this invention, is to produce a supplementary de-energizing voltage for the secondary relay X as the current in the discharge path to the track rails decays; and the primary and secondary windings of this transformer A are so wound and connected that a decrease of current in the primary 4 induces a voltage in the secondary 5 in a direction to oppose the normal energizing current for the relay X. The action of the coupling transformer A may be explained on the theory that, upon reduction in the impressed or driving voltage by the application of the wheel shunt, there is a decrease in the current flowing through the primary 4 to the relays T and X, which produces a change of flux through said primary, thereby inducing a voltage in the turns of its windings, and in turn a voltage in the secondary 5, such that a decrease in current is accompanied by creation of a de-energizing potential for the secondary relay X. It also appears that the reduction in energizing current through the relay X, occasioned by the opposing potentials produced by the self-induction of the track relay T, is accompanied by a reaction on the primary 4 to produce an opposing voltage in the discharge path to the track rails, thereby assisting in maintaining the de-energizing potential for the relay X and assuring its effective de-energization. There may be other reactions and other contributing factors in the operation; and it should be understood that this discussion is merely one theoretical explanation of the relations and interactions of the parts producing the desired operation. In this connection, it is apparent that the structural characteristics of the coupling transformer A have to be properly proportioned, including the number of turns, size of core, flux density, and the like, to conform with the electrical and magnetic characteristics of the relays T and X, and the other parts of the track circuit organization.

When the relay X is thus de-energized and opens its contacts 6 to disconnect the track relay T from the track circuit, the total resistance across the track rails would be increased were it not for the multiple resistance 7, the resistance of the two relays in multiple being less than the relay X alone; and this has a tendency to decrease the current drawn from the battery B and raise the inter-rail potential, particularly with wheel shunts of relatively high resistance. Accordingly, the relay X is preferably designed and constructed to require a relatively large current to attract its armature, as compared with that required to maintain its armature in its attracted position. Also, when the front contact 6 of the relay X opens, its back contact closes to establish an auxiliary circuit through the resistance 7 in multiple with the relay X, and as a substitute for the track relay T. The resistance 7 may be comparable with that of the primary track relay T, so that the total resistance across the track rails with the relay X de-energized is substantially the same as with the relay energized; but this resistance 7 is preferably somewhat lower than that of the primary relay T, so as to constitute an effective shunt to prevent energization of the relay X, and assure that it will remain de-energized under steady current conditions.

When the car or train leaves the track section, the sudden removal of the wheel shunt causes a quick rise in inter-rail voltage at the relay end. This tends to increase quickly the current through the primary 4 of this transformer A and resistance 7, as well as through the relay X and the secondary 5. The inductive reactance and resistance of the multiple paths in which current rises are such, among other things, that the rate of change through the primary 4 is greater than that through the secondary 5, with the result that a voltage is induced in the secondary 5, in a direction to add to the impressed voltage and energize the relay X sufficient to attract its armature. The energizing circuit for the track relay T is then completed, and the parts are restored to the normal condition. Thus, a sudden change in voltage and current conditions, produced by the removal of the wheel shunt, results in energization of the relay X under conditions of resistance of the ballast and wheel shunt which would prevent energization of the relay under steady current conditions.

One characteristic feature of this improvement is that the de-energizing action on the secondary relay X, which is characteristic of the organization shown and described in the prior application of Preston and Field above mentioned, is supplemented by an auxiliary de-energizing voltage created by the coupling transformer A. Likewise, this coupling transformer A produces a voltage to pick up the relay X when the train leaves the track circuit; and this enables the use of a shunting resistance 7 and a value for the pick-up current for the relay X which assures that it will remain de-energized under steady current conditions existing with a wheel shunt. It will be noted that the parts and circuits are organized on the so-called normally closed circuit principle of failure on the side of safety, including the auxiliary circuit through the resistance 7, which must be intact to permit re-energization of the relay when a train leaves the track section since, if this circuit is not intact, the pick up effect of transformer A on relay X, as explained above, is not present.

The specific embodiment of the invention illustrated and described is merely typical or illustrative of the nature of the invention; and it should be understood that various adaptations, modifications, and additions may be made in the parts and circuits as shown and described, without departing from the invention.

What I claim is—

1. In a track circuit for railroads, the combination with the track relay and a secondary relay energized in multiple therewith and having a front contact of the secondary relay controlling the energization of said track relay, of separate electro-magnetic means in series with the secondary relay directly across the track rails and responsive to the decay of energizing current of the track relay upon application of a wheel shunt for producing a voltage in the direction tending to deenergize said secondary relay.

2. In a track circuit for railroads, the combination with a direct current track relay, of a secondary relay energized in multiple with said track relay and having a front contact included in the electrical connections supplying current to said track relay, and electro-magnetic means responsive to the change in current flowing in the connections between said relays and the track rails for inducing voltages tending, respectively, to de-energize and to energize said secondary relay as a wheel shunt is applied and removed.

3. In a track circuit for railroads, the combination with a primary relay and a secondary relay both energized in multiple from the track rails, the secondary relay controlling the energization of the primary relay, of electro-magnetic means responsive to increases and decreases, respectively, in the current supplied to said relays for inducing voltages in directions tending for energizing and de-energizing said secondary relay.

4. In a track circuit for railroads comprising, in combination with a track relay, a secondary relay energized from the track rails in multiple with said track relay and controlling the energization of said track relay, and a coupling transformer in the connections between the relays and a rail for inducing a de-energizing voltage for said secondary relay, in the direction opposite to the energizing voltage across the rails upon decay of the energizing current for said track relay due to the application of a wheel shunt.

5. In a track circuit for railroads comprising, in combination with a direct current track relay, a coupling transformer having a primary winding in the connections between said track relay and the track rails, a secondary relay connected in multiple with said track relay and in series with the secondary winding of said transformer and arranged for controlling the energization of said track relay.

6. In a track circuit for railroads, in combination with the usual track relay, means for opening the energizing circuit for said track relay upon application of a wheel shunt comprising, a secondary relay energized from the track rails, and a coupling transformer connected between the relays and the rails for creating a de-energizing voltage for said secondary relay in the direction opposite to the energizing voltage across the rails upon a decrease in the energizing current for said track relay.

7. Electro-responsive means for detecting the presence and absence of a train on a track circuit comprising, a primary track relay, a secondary relay connected in multiple with said track relay and having a front contact included in the electrical connections supplying energizing current to said track relay, and a coupling transformer having its primary in the connections between both said relays and the track rails and its secondary in the energizing circuit for the secondary relay alone.

8. In a track circuit for railroads, electro-responsive means for detecting the presence or absence of a wheel shunt comprising, a primary track relay, a secondary relay connected in multiple with the primary relay, a coupling transformer responsive to variations in the energizing current for the primary track relay for inducing energizing and de-energizing voltages for the secondary relay respectively in the same, and opposite, directions, to the direction of the energizing voltage across the track rails, a resistance connectable in multiple with the secondary relay, and means operated by said secondary relay upon its de-energization for opening the electrical connections supplying current to the track relay and connecting the resistance in multiple with said secondary relay.

9. In a track circuit for railroads, in combination with a direct current track relay, means for opening the energizing circuit for said track relay upon application of a wheel shunt comprising, a secondary relay conductively connected to and energized from the track rails, and a coupling transformer connected between the relays and the rails for creating a deenergizing voltage for said secondary relay in the direction opposite to the interrail voltage, due to a decrease in the energizing current for said track relay.

NEIL D. PRESTON.